Figure 1:
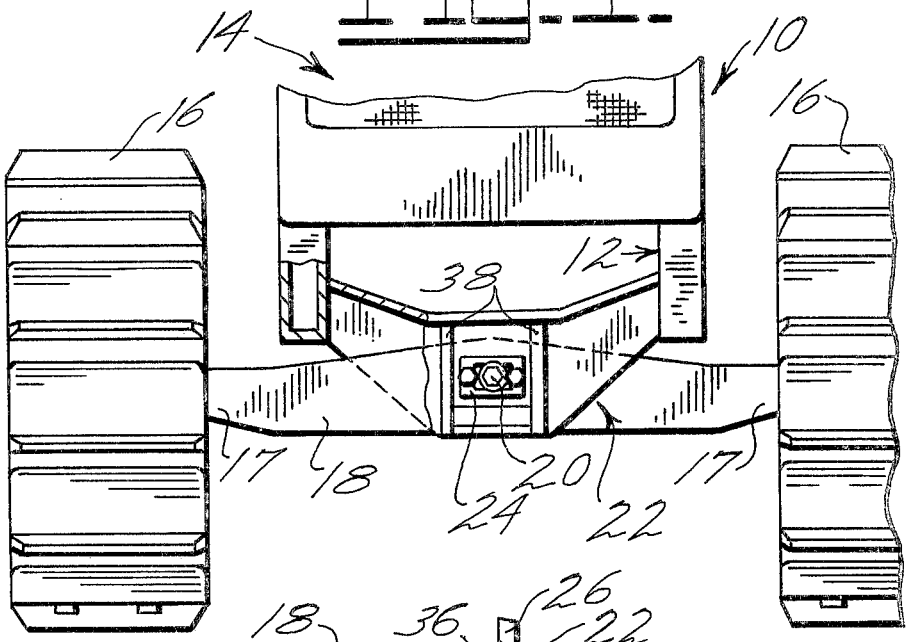
Figure 2:
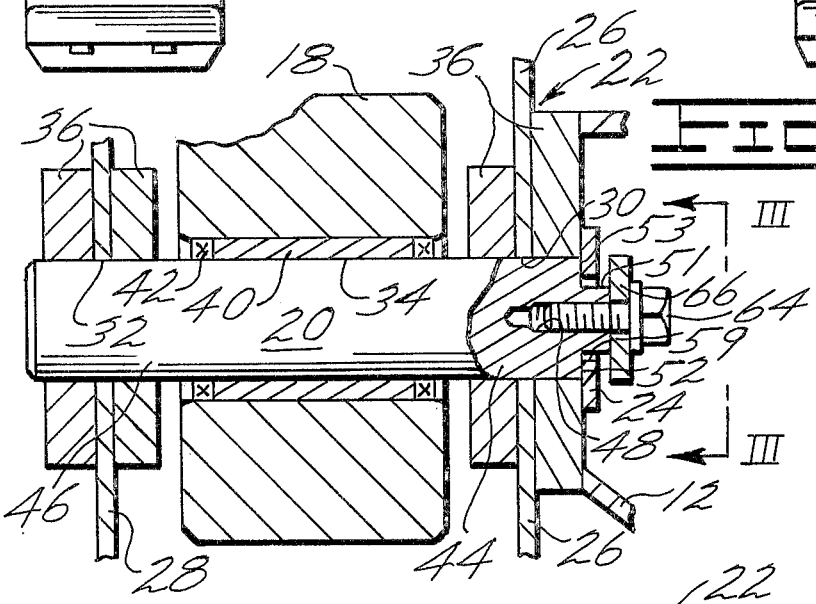
Figure 3:
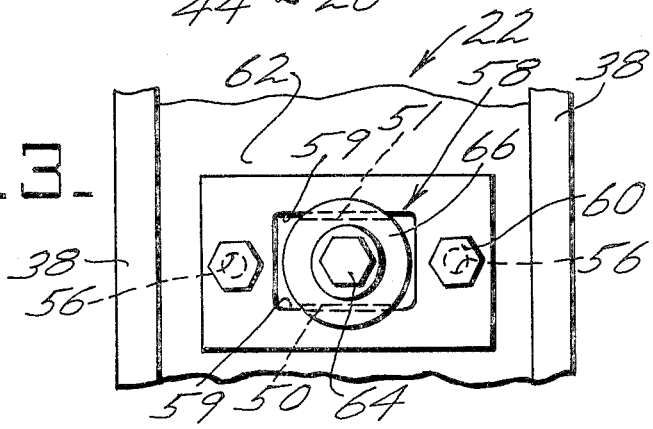

United States Defensive Publication [19] (H) [11] T985,006

Drochner [43] Aug. 7, 1979

[54] RETAINING MEANS FOR PIVOT PIN

[75] Inventor: Erich E. Drochner, Bettendorf, Iowa

[73] Assignee: Caterpillar Tractor Co., Peoria, Ill.

[21] Appl. No.: 956,009

[22] Filed: Oct. 30, 1978

[51] Int. Cl.[2] ..... F16C 11/06; F16D 1/12; F16D 3/00

[52] U.S. Cl. ..... 403/163; 403/258; 403/261

[57] ABSTRACT

Apparatus for pivotally connecting two relatively movable members has a pin having one end connectable with a retainer plate. Flat surfaces and shoulders formed on the one pin end respectively engage the plate and an aperture therein and with an end connected bolt and washer universally maintains the pin.

1 Claim, 1 Sheet Drawing,

5 Pages Specification

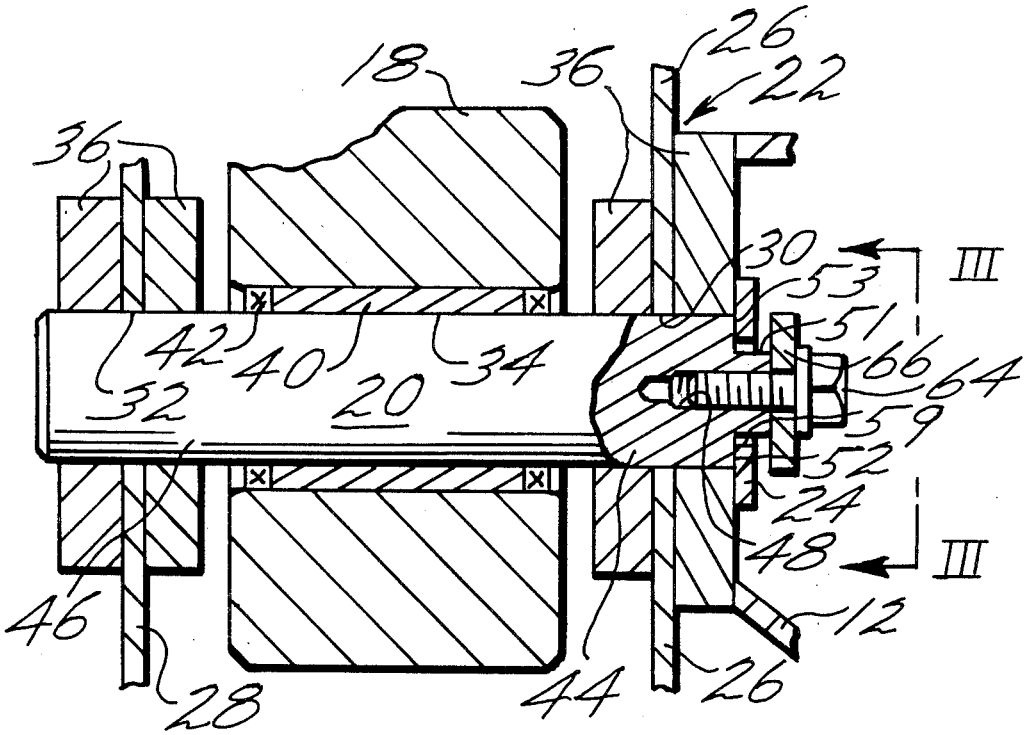

The file of this unexamined application may be inspected and copies thereof may be purchased (849 O.G. 1221, Apr. 9, 1968).